United States Patent
Ambach et al.

(12) 
(10) Patent No.: US 10,581,959 B2
(45) Date of Patent: *Mar. 3, 2020

(54) LOAD-BALANCING INPUT/OUTPUT REQUESTS IN CLUSTERED STORAGE SYSTEMS

(71) Applicant: International Business Machines Corporation, Armonk, NY (US)

(72) Inventors: Christian Ambach, Limburg (DE); Mathias Dietz, Oberhausen (DE); Rainer Wolafka, Hofheim-Langenhain (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,278

(22) Filed: Jan. 30, 2018

(65) Prior Publication Data
US 2018/0167454 A1 Jun. 14, 2018

Related U.S. Application Data

(63) Continuation of application No. 14/619,319, filed on Feb. 11, 2015, now Pat. No. 9,888,064.

(51) Int. Cl.
*H04L 29/08* (2006.01)
*H04L 29/06* (2006.01)

(52) U.S. Cl.
CPC ...... *H04L 67/1008* (2013.01); *H04L 67/1029* (2013.01); *H04L 67/141* (2013.01); *H04L 69/14* (2013.01)

(58) Field of Classification Search
CPC ............ H04L 67/1008; H04L 67/1029; H04L 67/141; H04L 69/14
(Continued)

(56) References Cited

U.S. PATENT DOCUMENTS 5,459,837 A * 10/1995 Caccavale ............... G06F 9/505
702/182
5,774,668 A * 6/1998 Choquier ................ G06F 9/505
370/480

(Continued)

OTHER PUBLICATIONS

Mell et al., "The NIST Definition of Cloud Computing," NIST Special Publication 800-145, Sep. 2011, National Institute of Standards and Technology, U.S. Department of Commerce.
(Continued)

*Primary Examiner* — Tauqir Hussain
(74) *Attorney, Agent, or Firm* — Peter K. Suchecki

(57) ABSTRACT

A computer-implemented method for load-balancing client input/output (I/O) requests in a clustered storage system may include receiving a request by a first node of a clustered storage system from a client to initiate a session between the client and the first node. The request may specify a multi-channel communication session. In response to receiving the request, an Internet Protocol (IP) address of the first and at least a second node may be transmitted to the client. The multi-channel communication session may be established between the client and the first and second nodes in which the client communicates with the first node using a first communication channel and communicates with the second node using a second communication channel. The first node may transmit to the second node session data determined at the first node. The second node may transmit to the first node session data determined at the second node.

17 Claims, 9 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 5,864,535 | A * | 1/1999 | Basilico | H04L 29/06 370/231 |
| 5,898,870 | A * | 4/1999 | Okuda | G06F 9/505 718/104 |
| 5,991,808 | A * | 11/1999 | Broder | G06F 9/505 709/203 |
| 6,006,259 | A * | 12/1999 | Adelman | H04L 29/06 709/223 |
| 6,006,264 | A * | 12/1999 | Colby | H04L 29/06 709/220 |
| 6,041,307 | A * | 3/2000 | Ahuja | G06Q 10/06312 705/7.22 |
| 6,212,565 | B1 * | 4/2001 | Gupta | H04L 29/06 709/229 |
| 6,389,448 | B1 * | 5/2002 | Primak | H04L 67/1029 709/225 |
| 8,452,819 | B1 * | 5/2013 | Sorenson, III | G06F 3/0611 707/809 |
| 8,578,053 | B2 | 11/2013 | Shinkai | |
| 8,886,781 | B2 | 11/2014 | Jain et al. | |
| 9,378,067 | B1 | 6/2016 | Agarwala et al. | |
| 9,407,692 | B2 | 8/2016 | Rajagopalan et al. | |
| 9,888,064 | B2 | 2/2018 | Ambach et al. | |
| 2012/0144019 | A1 | 6/2012 | Zhu et al. | |
| 2013/0073717 | A1 | 3/2013 | Collin et al. | |

OTHER PUBLICATIONS

List of IBM Patents or Patent Applications Treated as Related, Jan. 29, 2018, 2 pgs.

* cited by examiner

| Node 502 Hardware Components | Node 502 Hardware Capability Values | Node 504 Hardware Components | Node 504 Hardware Capability Values |
|---|---|---|---|
| 2 core 1Ghz CPU | 1000 | 8 core 1Ghz CPU | 4000 |
| 72 GB Memory | 4000 | 64 GB Memory | 3555 |
| 1X10 GB Ethernet | 2500 | 2X10 GB Ethernet | 5000 |
| Total Credits (I/O Request limit) | 1000 | Total Credits (I/O Request Limit) | 3555 |

LOAD-BALANCING INPUT/OUTPUT REQUESTS IN CLUSTERED STORAGE SYSTEMS

BACKGROUND

This disclosure relates generally to clustered storage systems, and more specifically, to load-balancing input/output (I/O) requests across cluster nodes of a clustered storage system.

Clustered storage systems, such as Network Attached Storage systems (NAS), provide client access to file data based on standard file protocols (e.g., SMB, NFS, etc.). Clustered storage systems may include two or more cluster nodes, a distributed files system, and shared storage. After a client computing device initiates a session (e.g., an HTTP session), the client may perform multiple I/O requests or metadata operations for data on the clustered storage system.

Current load-balancing mechanisms are inefficient. Because single server systems may be limited in scalability, more and more clustered storage systems (e.g., scale-out NAS systems) are appearing on the market. However, clustered storage systems today share a common problem in that it is very difficult to load-balance I/O requests across cluster nodes. Load-balancing is a way for a clustered storage system to control the amount of I/O requests that are transmitted by various clients to particular nodes of the clustered storage system. This may increase efficiency of the clustered storage system (e.g., decrease node saturation, increase throughput, etc.).The criteria for such load-balancing may depend on many static and dynamic aspects of the overall clustered storage system.

There are various disadvantages regarding prior art load-balancing. Prior art load-balancing uses session-based or stateful (e.g., DNS round robin) load-balancing because systems today do not allow for individual I/O request load-balancing during a single session. For example, load-balancing with the HTTP protocol cannot be used for NAS protocols such as SMB because SMB is session-based. Accordingly, client I/O requests cannot be transmitted to more than one cluster node within the clustered storage system during a single session without having a service interruption. In the prior art, once a session is established between a client and the clustered storage system, all of the client I/O requests for the session are handled by a single node within the clustered storage system. This may cause several disadvantages. For example, some nodes might be heavily utilized while others remain idle. A client may transmit a heavy I/O request workload during a single session, which might saturate the node. This saturation may impact other clients trying to communicate with the node as well as potentially impact the performance of the entire clustered storage system. Further, the clustered storage systems in the prior art do not have control over these sessions in case there is a heavy I/O request load. Moreover, the granularity of session-based load-balancing is not sufficient enough. Therefore, it is desirable to load-balance multiple I/O requests of a client across cluster nodes during a single session.

SUMMARY

One or more embodiments are directed to a computer-implemented method for load-balancing client input/output (I/O) requests in a clustered storage system comprising. The method may include receiving a request by a first node of a clustered storage system from a client to initiate a session between the client and the first node. The clustered storage system may have a plurality of nodes and the request may specify a multi-channel communication session. In response to receiving the request, the method may also include transmitting an internet protocol (IP) address of the first node and an IP address of at least a second node to the client by the first node. The method may further include establishing the multi-channel communication session between the client and the first and second nodes in which the client communicates with the first node using a first communication channel and communicates with the second node using a second communication channel. Moreover, the method may include transmitting to the second node from the first node session data determined at the first node and transmitting to the first node from the second node session data determined at the second node.

One or more embodiments are directed to a system for load-balancing client I/O requests in a clustered storage system. The system can include a first node of a clustered storage system having plurality of nodes. The first node may be configured to receive a request from a client to initiate a session between the client and the first node. The request may specify a multi-channel communication session. The system can further include at least a second node, wherein the first node may be further configured to transmit an internet protocol (IP) address of the first node and an IP address of the second node to the client in response to receiving the request. The first and second nodes may be further configured to establish the multi-channel communication session between the client and the first and second nodes in which the client may communicate with the first node using a first communication channel and may communicates with the second node using a second communication channel. The first node may be further configured to transmit to the second node session data determined at the first node and the second node may be further configured to transmit to the first node session data determined at the second node.

One or more embodiments are directed to a computer program product for load-balancing client I/O requests in a clustered storage system. The computer program product may include a computer readable storage medium having program instructions embodied therewith. The program instructions may be executable by a clustered storage system to cause the clustered storage system to receive a request by a first node of the clustered storage system from a client to initiate a session between the client and the first node. The clustered storage system may have a plurality of nodes and the request may specify a multi-channel communication session. The program instructions may be executable by a clustered storage system to cause the clustered storage system to further transmit, in response to the receiving of the request, an internet protocol (IP) address of the first node and an IP address of at least a second node to the client by the first node. Moreover, the program instructions may be executable by the clustered storage system to cause the clustered storage system to further establish the multi-channel communication session between the client and the first and second nodes in which the client communicates with the first node using a first communication channel and communicates with the second node using a second communication channel. The program instructions may be executable by the clustered storage system to cause the clustered storage system to further transmit to the second node from the first node session data determined at the first node and transmit to the first node from the second node session data determined at the second node.

Figure 1:
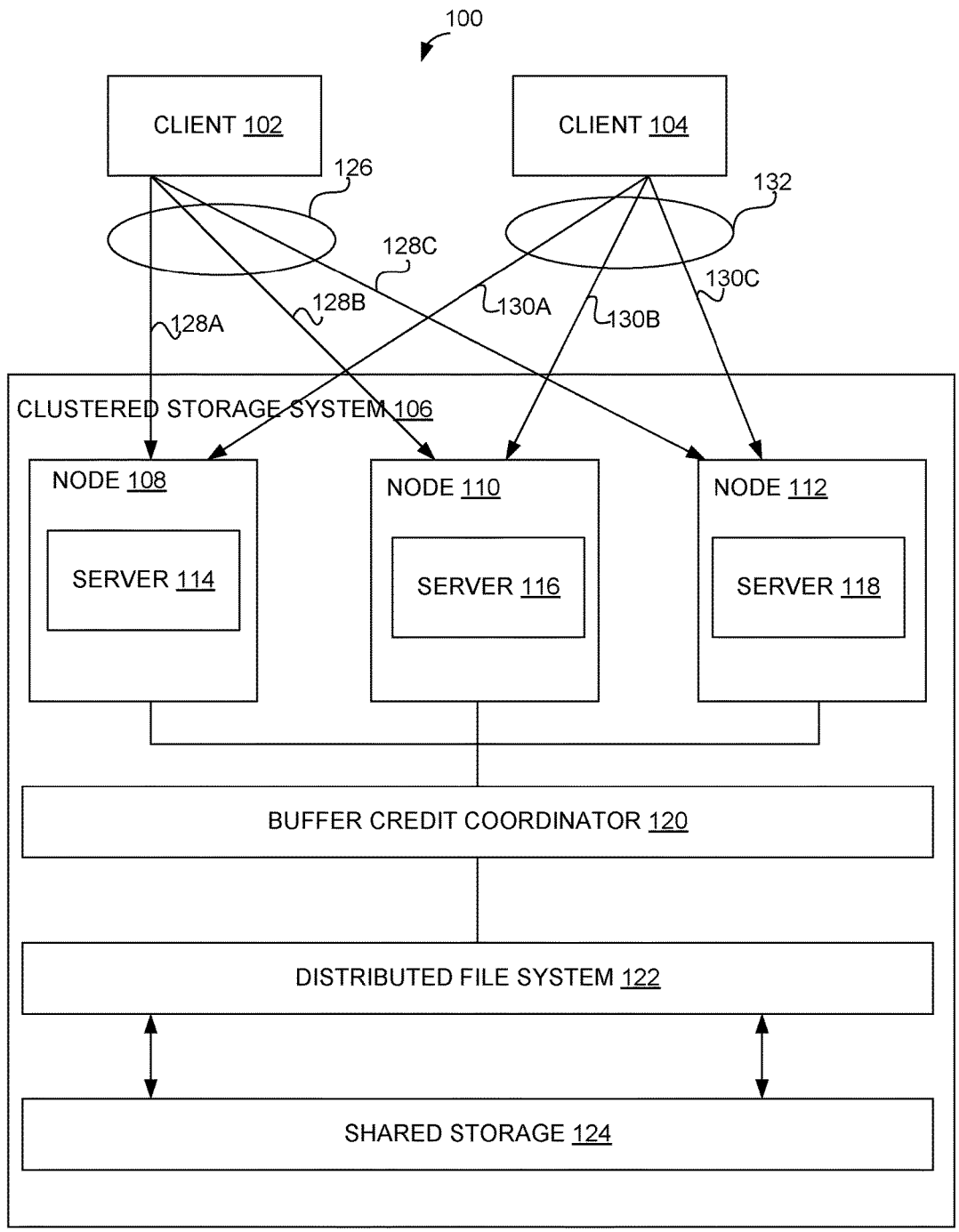
FIG. 1 illustrates a diagram of an example computing environment 100, in accordance with an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to clustered storage systems, more particular aspects relate to load-balancing I/O requests across cluster nodes of a clustered storage system during a single session. While the present disclosure is not necessarily limited to such applications, various aspects of the disclosure may be appreciated through a discussion of various examples using this context.

Load-balancing is a way for a clustered storage system to control the amount of I/O requests that are performed to particular nodes of the clustered storage system so as to increase efficiency of the clustered storage system (e.g., decrease node saturation, increase throughput, etc.). Clustered storage systems may fail to load-balance, or ineffectively load-balance client I/O requests across multiple nodes. For example, load-balancing may be performed with hypertext transfer protocol (HTTP) and the load-balancing may accordingly fail to be used for various NAS protocols, such as a server message block (SMB) protocol. The SMB protocol may only allow load-balancing for each client session, as opposed to load-balancing different I/O requests for a client during a single session. Consequently, various I/O requests of a client may not be able to be transmitted to other cluster nodes without having a service interruption. Under this example, some nodes may be heavily utilized while others may remain idle. Accordingly, some nodes may be heavy utilized by a first client to a degree that a second client's access to the data may be delayed because of node overload. Moreover, a heavily utilized node may negatively impact the performance of the entire cluster system.

In various embodiments of the present disclosure, a client's I/O requests may be load-balanced by the clustered storage system for a single client session. For example, a first node of a clustered storage system may receive a request from a client to initiate a session between the client and the first node. The request may specify a multi-channel communication session. A multi-channel communication session allows multiple channels to be established to different nodes of the clustered storage system during a single client session. Accordingly, a client may transmit a quantity of I/O requests across multiple nodes during the session. In order to determine how many I/O requests the clustered storage system may allow the client to transmit to each node, the clustered storage system may first determine an I/O request limit for the clustered storage system. The clustered storage system may then determine an I/O request limit for each node (or at least a second node) of the clustered storage system. In response to the determining of the I/O request limits for the clustered storage system and each node, the clustered storage system may grant the client various quantities of I/O requests for the client to transmit to each of the nodes, as further described below.

In various embodiments, the determining of the clustered storage system and node I/O request limits, and the granting of various quantities of I/O requests to a client may be done in various manners, such as through SMB crediting. SMB crediting allows the clustered storage system to issue a credit limit, which corresponds to an I/O request limit (e.g., 1 credit equals 1 I/O request), to a client to inform the client about the available credits the client has to perform I/O requests on any given node. In this example, the client may not place any more I/O requests on a first given node after the credit limit has been reached for the first node. Instead, the client I/O requests may be sent through a different channel that corresponds to a second node where more credits may be available.

FIG. 1 illustrates a diagram of an example computing environment 100, in accordance with an embodiment of the present disclosure. The computing environment 100 may be implemented in the cloud computing environment 50 illustrated in FIG. 9, which is described in more detail below. The computing environment 100 may include one or more clients 102 and 104. The client 102 may establish a multi-channel communication session 126 with any of the nodes (108, 110, or 112) in order to make multiple connections to different nodes so that the client 102 may transmit various I/O requests to the different nodes during a single session. Accordingly, the client 102 may communicate with node 108 using communication channel 128A. The client may also communicate with node 110 using communication channel 128B. The client may further communicate with node 112 using communication channel 128C. Client 104 may also establish its own multi-communication session 132, and therefore establish respective communication channels (130A, 130B, and 130C) to corresponding nodes (108, 110, and 112). The clustered storage system 106 may further include nodes 108, 110, and 112 and each node may include servers (e.g., SMB servers) 114, 116, and 118 respectively. The clustered storage system 106 may further include a buffer credit coordinator 120, a distributed file system 122, and shared storage 124.

A clustered storage system 106 may utilize two or more nodes to distribute workload (e.g., I/O requests) over the nodes to increase performance, capacity, or reliability. The clustered storage system 106 may be any suitable clustered storage system. For example, the clustered storage system 106 may be a Network Attached Storage (NAS) system, an Internet Small Computer System Interface (iSCSI) clustered storage system, Fibre Channel based clustered storage system, or any other type of clustered storage system that provides an access protocol to allow flow control management between the client and one or more nodes.

In various embodiments, each node (108, 110, and 112) may be a connection point (e.g., a redistribution point or an end point for data transmissions) for client interface with the clustered storage system 106. The nodes (108, 110, or 112) may be configured according to the cloud computing node 10 of FIG. 8, as described in more detail below. In embodiments, a node (108, 110, or 112) may be blade servers operating in a SMP configuration. A node (108, 110, or 112) may be a grouping of individual instances of servers (e.g., blades) combined in a single unit. In other embodiments, a node may be a desktop computer, computer server, or any other computing system known in the art capable of performing functions in accordance with embodiments of the present disclosure.

The client 102 and 104 may be any suitable client that utilizes various standard protocols to communicate with a clustered storage system. In embodiments, clients 102 and 104 may be configured according to the computer system/server 12 of FIG. 8, which is described in more detail below. In embodiments, the client may utilize protocols such as SMB, Network File System (NFS), Apple Filing Protocol (APF), Netware Core Protocol (NCP), Andrew File System (AFS), or any other protocol. According to some embodiments, the client 102 or 104 may initiate a session setup request with a node specifying a multi-channel communication session 126, 132. According to some embodiments, the particular node selected to receive the session setup request may be determined by a Domain Name System (DNS) round robin technique. DNS round robin is a way to organize which node of the clustered storage system 106 may receive initial client I/O session requests. In the DNS round robin technique, the nodes 108, 110, and 112 are selected in a rotational organized manner for every client session. For example, at a first time, a first client 102 may initiate a session with node 108. At a second time, a second client 104 may initiate a session with node 110. At a third time, a third client may initiate a session with node 112. Accordingly, nodes 108, 110, and 112 may be utilized to initiate a session with various clients in a rotational or looping fashion. According to some embodiments, a client 102 or 104 may initiate a session with any node of the clustered storage system 106 because of the distributed file system 122. The distributed file system 122 ensures that the requested data is available to all cluster nodes (108, 110 and 112) as a shared pool of data, and written to the shared storage 124.

Alternatively, any node 108, 110, or 112 may be randomly selected to initiate an I/O session setup request from a client 102 or 104. In some embodiments, the node selected for session initiation may be based on which node has the least I/O request load or which node has the greatest bandwidth. For example, if client 102 initiated a multichannel communication session 126 to the clustered storage system 106, it may be determined that node 108 has the greatest I/O request load (e.g., the most I/O requests received by any of the nodes) and node 112 had the least I/O request load (i.e., the least amount of I/O requests received by any of the nodes). Accordingly, Node 112 may be selected to initiate a session with client 102 to increase response time and because of the less demanding I/O request load.

The distributed file system 122 may ensure that the data that client 102 or 104 wants is available on all of the nodes 108, 110, 112, and written to shared storage 124. The distributed file system 122 and storage 124 may accordingly provide a way for the techniques as described above to occur, such as DNS round robin. Because each node may access the data requested using the distributed file system 122, any technique may be employed to initiate a session and complete I/O requests between a client and any of the nodes in the clustered storage system 106. In various embodiments, the distributed file system 122 may be any suitable distributed file system that may be utilized in the clustered storage system 106. For example, the distributed file system 122 may be a SMB distributed file systems, AFS distributed files system, AFP distributed file system, Distributed Computing Environment (DCE) distributed file system, or any other distributed file system 122.

Servers 114, 116, and 118 may be utilized by each of the nodes 108, 110, and 112 respectively to respond to an initial multichannel communication setup request by a client and provide other cluster node information. In embodiments, servers 114, 116, and 118 may be instances (e.g., blades) of each of the respective nodes 108, 110, and 112 (e.g., blade servers). In an illustrative example, server 114 on node 108 may receive a request from client 102 to initiate a session between the client 102 and node 108. The request may specify a multi-channel communication session 126. Server 114 may then respond by transmitting to the client 102 Internet Protocol (IP) addresses of all of the nodes in the clustered storage system 106 (i.e., nodes 108, 110, and 112). Accordingly, the multi-channel communication session 126 between the client 102 and each of the nodes (108, 110, and 112) may be established. Therefore, the client 102 may communicate with node 108 using communication channel 128A. The client 102 may further communicate with node 110 using communication channel 128B. The client 102 may also communicate with node 112 using communication channel 128C. In various embodiments of the present disclosure, multiple channels may be opened to multiple nodes, as opposed to opening multiple channels to a single node. According to some embodiments, the opening of the multichannel communication session (126 and 132) may occur through a SMB multichannel function. In other embodiments, any standard protocol multiple channel opening function may be utilized to open one or more channels to all of the nodes (108, 110, and 112) of the clustered storage system 106.

According to some embodiments, the buffer credit coordinator 120 may load-balance multiple single-session I/O requests across all of the nodes 108, 110, and 112 using each of the communication channels (e.g., for client 102, communication channels 128A, 128B, and 128C). For example, client 102 may issue a first I/O request to node 108 using communication channel 128A. The client may also issue a second I/O request to node 110 using communication channel 128B. The buffer credit coordinator 120 may load-balance by determining a first or overall I/O request limit for the clustered storage system and an I/O request limit for each of the nodes (108, 110, and 112) of the clustered storage system 106. The buffer credit coordinator 120 may communicate with and be aware of the clustered storage system's 106 limitations, health, and workload. Accordingly, the buffer credit coordinator 120 may determine a maximum I/O request load that the clustered storage system 106 and each individual node can handle. In response to the determining of the I/O request limits for the clustered storage system and each node, the clustered storage system may grant the client various quantities of I/O requests for the client to transmit to each of the nodes based on the I/O request limit for the clustered system and I/O request limit for each of the nodes, as further described below.

According to some embodiments, the buffer credit coordinator 120 may determine an I/O request limit for each of the nodes by utilizing crediting techniques, such as SMB crediting. As discussed, SMB crediting allows the buffer credit coordinator 120 to issue a credit limit, which corresponds to an I/O request limit (e.g., 1 credit equals 1 I/O request), to a client to inform the client about the available credits the client has to use on any given node. Accordingly, the client may not place any more I/O requests on a first given node after the credit limit has been reached for the first node. Instead, the client I/O requests may be sent through a different channel that corresponds to a second node where more credits may be available. For example, a buffer credit coordinator 120 may issue client 102 a total of 50 credits (i.e., 50 I/O requests). Node 108, however may only have 40 credits available before it reaches a credit limit. Nodes 110 and 112 may only have 5 credits each available before reaching a credit limit. Accordingly, a buffer credit coordinator 120 may provide that the first 40 credits that the client has will be used on node 108, the second 5 credits may be distributed to node 110, and the last 5 credits may be distributed to node 112. Therefore, a client may be issued 40 credits to use on node 108, 5 credits to use on node 110, and 5 credits to use on node 112. In this example, each of the client's 102 I/O requests during a single session are distributed to all of the nodes so that no I/O request is transmitted to a node that has surpassed the node's credit limit.

Figure 2:
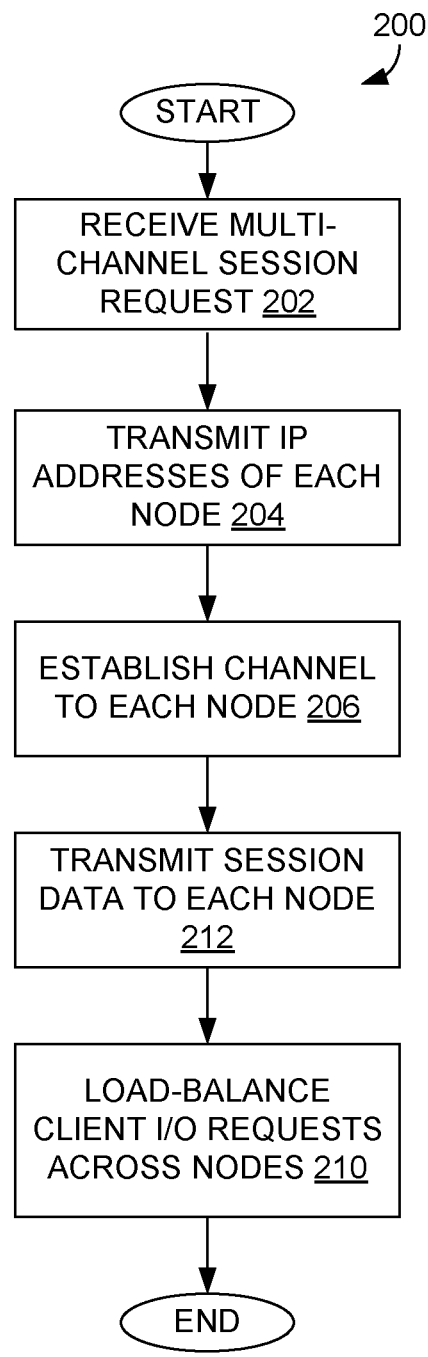
FIG. 2 is a flow diagram of an illustrative process for establishing a multi-channel communication session between a client and a node of the clustered storage system, according to embodiments.

FIG. 2 is a flow diagram of an illustrative process for establishing a multi-channel communication session between a client and a node of the clustered storage system, according to embodiments. The process 200 may start when a client sends a session setup request to any node of the clustered storage system specifying a multi-channel session request. The node may then perform operation 202 by receiving and accepting the session setup request. A client may then send a query network information request to the node, which may be utilized as a "callout" to query the network interface IP addresses on all of the nodes of the clustered storage system. The node may then perform operation 204 by transmitting IP addresses of all of the nodes' network interfaces in the clustered storage system to the client. The client and the node may then establish the multi-channel communication session. Specifically, the client may respond to the transmitting of IP addresses by performing operation 206 to establish a channel to each node by treating each network interface as local network interfaces on the node. The client may accordingly open a dedicated channel (e.g., SMB_SESSION_FLAG_BINDING) to each of the local network interface IP addresses. The node may perform operation 212 by transmitting session data to the other nodes such as file object locks, leases, share modes and the like. Sharing session data may allow each of the nodes of the clustered storage system to effectively interface with the client during the session. A buffer credit coordinator of the clustered storage system may then perform operation 210 to load-balance each client I/O request across one or more nodes during the multi-channel session, which is discussed in more detail in FIG. 3 below.

Figure 3:
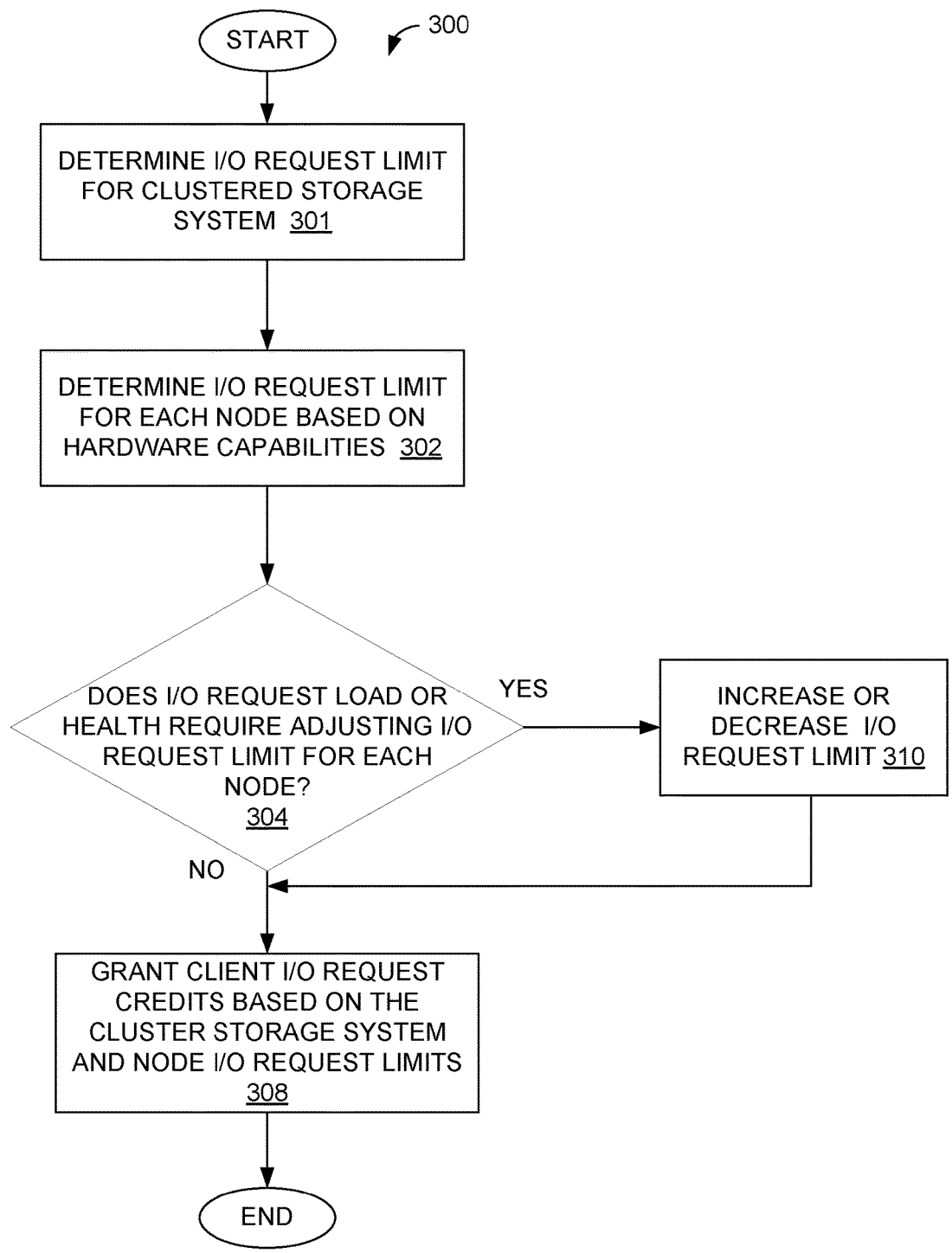
FIG. 3 is flow diagram of an illustrative process for load-balancing each I/O request across the clustered storage system by determining an I/O request limit for the clustered storage system, determining an I/O request limit for at least two nodes, and granting the client a quantity of I/O requests to transmit to the nodes based on the I/O request limit for the clustered storage system and at least two of the nodes.

FIG. 3 is flow diagram of an illustrative process 300 for load-balancing each I/O request across the clustered storage system by determining an I/O request limit for the clustered storage system, determining an I/O request limit for at least two nodes, and granting the client a quantity of I/O requests to transmit to the nodes based on the I/O request limit for the clustered storage system and at least two of the nodes. According to some embodiments, the process 300 may begin when a buffer credit coordinator determines a first or overall I/O request limit for the clustered storage system in operation 301, as discussed more below. In embodiments, after the I/O request limit for the clustered storage system is determined, the limit may be partitioned into smaller I/O request limits for each node, as discussed more below. The smaller I/O request limits may include performing operation 302 to determine an I/O request limit for each node based on each nodes' hardware capabilities, as discussed below. According to some embodiments, the I/O request limit for each node may require adjusting based on the I/O request load of each node and node health, as specified in operation 304. If the I/O request limit of one or more nodes needs to be adjusted, then a buffer credit coordinator may perform operation 310 to increase or decrease an I/O request limit for the one or more nodes. If the I/O request limit does not need to be adjusted, the credit limit for each node based on hardware capabilities may remain. A buffer credit coordinator may perform operation 308 to grant each client I/O request to transmit across the one or more nodes depending on the clustered storage system each nodes' I/O request limit.

The process 300 may begin when a buffer credit coordinator (120 of FIG. 1) determines an overall I/O request limit for the clustered storage system in operation 301. In embodiments, SMB crediting allows the buffer credit coordinator to issue a credit limit for the entire clustered storage system, which corresponds to an I/O request limit (e.g., 1 credit equals 1 I/O request). The overall I/O request limit for the clustered storage system may be determined in various manners. According to some embodiments, the I/O request limit for the clustered storage system may be determined by static techniques, such as determining the clustered storage system bandwidth and dividing the bandwidth by an average I/O request size for each I/O request performed by a plurality of clients to a plurality of nodes of the clustered storage system in a particular interval. For example, the clustered storage system bandwidth, which includes all of the nodes, may be 20 gigabytes (GB) per second. A first client may issue an I/O request that is 60 kilobytes. A second client may issue an I/O request that is 50 kilobytes. A third client may issue an I/O request that is 64 kilobytes. All of these clients may issue these requests in a 60 second time interval. Accordingly, the overall clustered storage system I/O request limit may be ~340,000 I/O requests that the clustered storage system can handle from all clients in the one minute time interval (20 GB/(60 kb+50 kb+64 kb)/3).

Alternatively, the overall clustered storage system I/O request limit may be set by determining a quantity of I/O requests per second (IOP) that the clustered storage system executes in a particular time interval. For example, a clustered storage system may only be capable of executing 240,000 IOPs in any given one minute interval. Accordingly, the overall I/O request limit for the entire clustered storage system may be ~240,000 I/O requests per second that all clients combined may perform on the clustered storage system. Alternatively, the clustered storage system may execute a much lower quantity of I/O requests in a one minute time interval than it is capable. In these embodiments, the I/O request limit for the clustered storage system may be a lower quantity of IOPs than the clustered storage system is capable of executing. For example, a clustered storage system may be capable of executing 240,000 IOPs in a one minute interval. However, the buffer credit coordinator may determine to lower the capability by any percentage (e.g., 5%, 10%, 20%, etc.) to lower the I/O request limit. This may increase throughput of the clustered storage system and reduce workload of the clustered storage system. Accordingly, the overall clustered storage system I/O request limit may be 200,000, 220,000 IOPS in a one minute interval, or any other suitable number that is lower than the capability of IOPs that the clustered storage system can execute. According to embodiments, the time interval that IOPs may be determined in may be any suitable interval. For example, 240,000 IOPs in a 1 minute interval, 480,000 IOPs in a 2 minute interval, or 720,000 IOPs in a 3 minute time interval.

Figure 4:
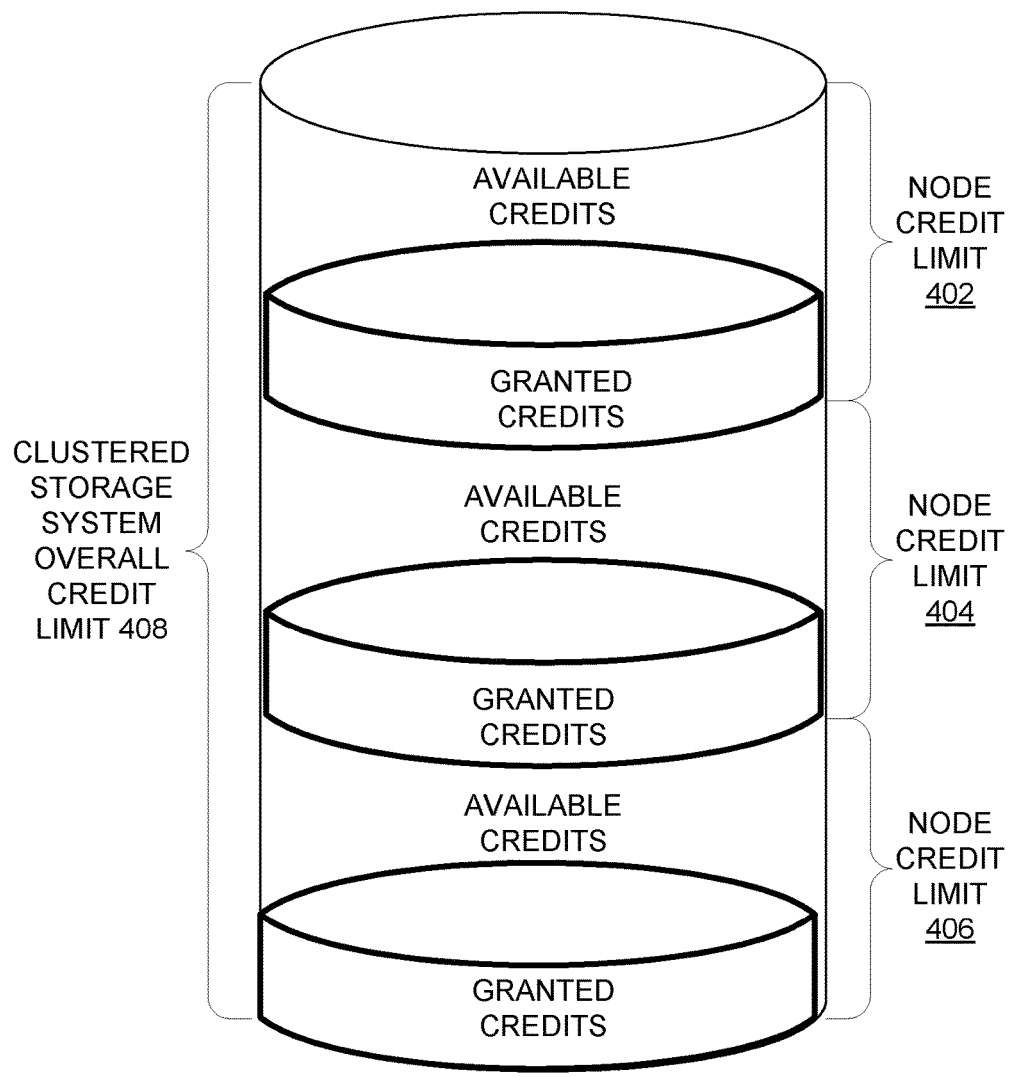
FIG. 4 is a diagram of an example clustered storage system credit limit, which includes all of the node credit limits.

According to some embodiments, after the overall I/O request limit for the entire clustered storage system is determined, the overall I/O request limit is partitioned into sections by determining an I/O request limit for at least two nodes of the clustered storage system. For example, FIG. 4 is a diagram of an example clustered storage system credit limit 408 (also known as credit pool or I/O request limit), which includes all of the node credit limits (also known as node credit pools or node I/O request limits) 402, 404, and 406. In the embodiment of FIG. 4, the node credit limits 402, 404, and 406, when added together equal the clustered storage system credit limit 408. In an example illustration, if the overall clustered storage system credit limit is 6000, node credit limit 402 may be 1000, node credit limit 404 may be 2000, and node credit limit 406 may be 3000. All of the credits available for the entire clustered storage system may accordingly be partitioned into sub-credit limits for each node (1000+2000+3000=6000). FIG. 4 also demonstrates how each of the node credit limits may decrease according to the number of credits granted to a client. For example, if a node had an initial node credit limit 402 of 1000 credits, but a buffer credit coordinator granted 400 credits to a client to use on a particular node, node credit limit 402 would decrease by 400. Consequently, there would be 600 available credits (1000−400=600) for the node. According to some embodiments, the buffer credit coordinator may not grant more credits to all of its clients than the clustered storage system credit limit 408.

Figure 5:
FIG. 5 is an illustrative table demonstrating various hardware components and respective hardware capability values of different nodes.

According to some embodiments, the determining of each of the node credit limits (I/O request limits) includes determining a hardware capability value for a plurality of hardware components of each of the nodes. A lowest hardware capability value for the plurality of hardware components of a first node may be the first node's I/O request limit and a lowest hardware capability value for the plurality of hardware components of a second node may be the second node's I/O request limit. For example, FIG. 5 is an illustrative table 500 demonstrating various hardware components and respective hardware capability values of different nodes. In this example, the hardware components that may be assessed for configuring a credit limit may include central processing units (CPUs), memories, and network interfaces, such as Ethernet. In other embodiments, however, different components may be assessed. For example, other network interfaces may be assessed such as sound cards, graphics cards, and storage controller devices.

The table 500 displays two nodes' 502 and 504 respective hard ware component types, and corresponding hardware capability values for each component type. In this example, node 502 includes a 2 core 1 Gigahertz CPU, whereas node 504 includes an 8 core 1 Gigahertz CPU. Consequently, a buffer credit coordinator may assign a hardware capability value of 4000 to node 504 and only assign a hardware capability value of 1000 to node 502 because node 502 may have a relatively slower CPU. In various embodiments, the hardware capability values may correspond to I/O requests. For example, the Node 502 hardware capability value of 4000 may be equivalent to 4000 credits or I/O requests. Node 502 also includes a 72 Gigabyte memory, whereas node 504 includes a 64 Gigabyte memory. The buffer credit coordinator may accordingly assign a hardware capability value of 4000 to node 502 and 3555 to node 504. The difference in credits (which is 445) may not be vastly different for the memory component because each memory of both nodes includes analogous memory storage capacities. Node 502 also includes a 1×10 Gigabyte Ethernet, whereas node 504 includes a 2×10 Gigabyte Ethernet, which allows twice the amount of data to pass through the Ethernet. Accordingly, the buffer credit coordinator may assign node 504 twice the hardware capability value than node 502 (i.e., 5000 versus 2500). The table 500 shows that the node 502 total credit amount (I/O request limit) is 1000, whereas the node 504 credit limit is 3555. According to embodiments, a buffer credit coordinator may determine a lowest capability value for each hardware component of each of the nodes, and the lowest capability value is the I/O request limit for that node. For example, in table 500 node 502's lowest capability value is 1000 for the 2 core 1 Gigahertz CPU. Therefore, the credit limit (I/O request limit) of node 502 is 1000. Likewise, node 504's lowest capability value assigned is 3555 credits for the 64 Gigabyte memory. Therefore, the credit limit of node 504 is 3555. The buffer credit coordinator may select these respective lowest capability values as credit limits because the component that corresponds to the credit limit (e.g., 2 core 1 Gigahertz CPU & 1000 credits) may be the "bottleneck" of the node that restricts node processing speed or efficiency the most. Accordingly, because node 502 includes a component that may be more of a bottleneck than node 504, node 502 is given a lower credit limit. Therefore, a buffer credit coordinator may only allow 1000 I/O requests (for any amount of clients) to be performed on node 502 before a limit is reached, whereas the buffer credit coordinator may allow 3,555 I/O requests to be performed on node 504.

According to some embodiments, the buffer credit coordinator may adjust the I/O request limit for each node based on respective I/O request loads of the nodes, and based on a health state of the nodes. In operation 304 of FIG. 3, the I/O request limit derived from operation 302 based on hardware capabilities (FIG. 5 for example), may or may not need to be adjusted according to the current I/O request workload of each node. For example, each node credit limit may further be reduced by taking dynamic system measurements into account such as resource utilization, response times, additional workloads, error conditions (e.g., RAID rebuilds), and the like. According to some embodiments, these system metrics may be evaluated on a regular basis (e.g., every 1 minute) to adjust the node credit limit accordingly.

In various embodiments, the adjusting of the I/O request limit for each node based on I/O request load may be performed in three steps. For example, a first step may be determining a number of I/O requests made by a plurality of clients on each node of the clustered system in a given time interval (hereinafter referred to as the "credit burn rate"). A second step may be determining a chosen quantity (e.g., optimal quantity) of I/O requests to be made on each node of the clustered storage system in the given time interval (hereinafter referred to as the "chosen credit burn rate"). A third step may be adjusting the I/O request limit by comparing the credit burn rate with the chosen credit burn rate, and increasing or decreasing the I/O request limit closer to the chosen credit burn rate.

A buffer credit coordinator may measure the credit burn rate for each node in the clustered storage system. The node credit burn rate (NCBR) may be the number of credits requested by all clients on a particular node in a given time interval, shown as follows: NCBR=(number of credits)/(time interval). For example, a clustered storage system may include a first and second node. The first node may have three connected clients, each requesting 500 credits in a 60 second time interval. A second node may only have a single connected client, which requests 250 credits in the 60 second interval. Accordingly, the first node's burn rate would be 25 credits per second ((3 clients multiplied by 500 credits)/60 seconds). The second node's burn rate may be 4.17 credits per second (250 credits/60 seconds). In some embodiments, the overall clustered storage system burn rate may accordingly be 29.17 credits per second that the clustered storage system is receiving by all of the clients (first node's burn rate 25+the second node's burn rate 4.17).

In some embodiments, the chosen credit burn (OCBR) rate may be based on the individual node credit limit (I/O request limit), the entire clustered storage system credit limit (I/O request limit), and burn rate of each node. The chosen credit burn rate may be determined by dividing the overall clustered storage system burn rate by the overall clustered storage system credit limit (i.e., the cluster utilization). The buffer credit coordinator may then evaluate the chosen node credit burn rate by applying the cluster utilization to each nodes' credit limit. This calculation may be represented as follows: OCBR=(clustered storage system burn rate/clustered storage system credit limit)*node credit limit. For example, a clustered storage system credit limit may be 4000. A first node's credit limit may be 3000, and a second node's credit limit may be 1000. The overall storage system cluster burn rate may be 1750. Calculations for a chosen credit burn rate for any given node may be represented as follows: (OCBR for the first node)=(1750/4000) *3000=1312.5. (OCBR for the second node)=(1750/4000) *1000=437.5. Accordingly, a buffer credit coordinator may determine that the first node should receive no more than 1,312 I/O requests, and the second node should receive no more than 437 I/O requests. In various embodiments, the buffer credit coordinator may determine which node has the lowest credit burn rate, and maximize I/O requests to the node by increasing the respective I/O request limit for that node. Likewise, nodes with a heavier I/O request limit workload may have a decreased I/O request limit.

In various embodiments, the I/O request limit may also need to be adjusted according to node health. For example, if there is an outage of a network interface controller, the buffer credit coordinator may automatically adjust the node credit limit accordingly to cope with the network outage. In this example, the node credit limit may be reduced by 1000 credits for each error that occurs. However, the credit limit reduction may be any suitable reduction value based on the system and type of error. In another example, there may be an automatic reduction of a credit limit for a given node based on a bonded network interface losing network paths due to an error with one or more of the network adapters. The credit limit reduction may be any appropriate reduction.

In operation 310 of FIG. 3 and consistent with some embodiments, if the I/O request limit needs to be adjusted, the buffer credit coordinator may adjust the I/O request limit by comparing the credit burn rate with the chosen credit burn rate, and increase or decrease the credit burn rate closer to the chosen credit burn rate. A buffer credit coordinator may first evaluate each node to determine if the current burn rate is above or below the chosen credit burn rate. According to some embodiments, the buffer credit coordinator may determine if the actual burn rate is above or below a particular threshold before determining to adjust the credit burn rate. In this embodiment, if the burn rate is above a high threshold (i.e., threshold value above the chosen credit burn rate), the buffer credit coordinator may reduce available credits per client by a factor of X. If the burn rate is below a low threshold (i.e., threshold value below the chosen credit burn rate), the buffer credit coordinator may increase the available credits per client by a factor of X. X may be any suitable value based on the system and the degree to which the burn rate is above or below a threshold. Moreover, if the burn rate is not above a high threshold or below a low threshold, the buffer credit coordinator may determine not to adjust the credit limit.

In an illustrative example, a threshold values might be 100 I/O requests below or above a chosen credit burn rate of 1950 (i.e., 1850 is a low threshold, 2050 is a high threshold). In this example for a given node, if the actual node credit burn rate is 2000, although 50 I/O requests are occurring over the 1950 chosen credit burn rate, because the credit burn rate of 2000 is still 50 credits below the high threshold of 2050, the buffer credit coordinator may determine not to adjust the credit limit. In various embodiments, the threshold value may be based on hardware capabilities or dynamic factors such as node health or node I/O load. According to some embodiments, after each node's I/O request limit has been determined and adjusted, a node I/O request limit may be finalized.

In operation 308 of FIG. 3, a buffer credit coordinator may grant a client a quantity of I/O requests for the client to transmit to two or more nodes based on the determining of the clustered storage system I/O request limit and each of the two or more nodes' I/O request limits (which may have been adjusted as specified above). In various embodiments, the load-balancing and credit limits are managed by different entities in different manners. According to some embodiments, the buffer credit coordinator may assign credits to each client and each client may be the actual entity that manages the I/O requests across multiple nodes of the clustered storage system. In this embodiment, because a buffer credit coordinator is merely assigning a credit amount to the client, the client may choose to consume any amount of its credits on any node as long as the node's credit limit has not been reached. Accordingly, the buffer credit coordinator may have little control over how the I/O requests are being distributed and how many credits are actually being consumed by the client. In embodiments, a buffer credit coordinator may not grant more I/O requests to any and all clients than the overall I/O request limit for the entire clustered storage system. Likewise, a client may not be granted more credits for the client to transmit to any respective node if the amount of credits are above an I/O request limit for the node.

In an illustrative example, referring back to FIG. 1, if a buffer credit coordinator 120 issues client 102 1000 credits and node 108 has 1500 credits left before it reaches a credit limit, node 110 has 2000 credits left, and node 112 has 3000 credit limits left, the client 102 may determine that because it has 1000 credits, which when utilized on node 108 would still leave node 108 with 500 credits left, the client may load-balance by utilizing all of its credits or I/O requests on node 108. In other examples, the client 102 may determine that because node 112 has the most credits available before reaching a credit limit, that the 1000 credits should all be utilized on node 112. In yet other examples, clients may perform a load-balancing technique in which the credits would be distributed to all three nodes based on the quantity of credits available and proportionately distributing credits accordingly. For example, using the illustration above, because node 112 has the most credits available (3000), 46 percent of the I/O requests will be sent to node 112. Because node 110 has the second most credits available (i.e., 2000), 31 percent of the I/O requests will be sent to node 110. Lastly, because node 108 has the least amount of credits available (i.e., 1500), 23 percent of the I/O requests will be sent to node 108. In other embodiments, a buffer credit coordinator may perform the above techniques to balance the multiple I/O requests.

Figure 6:
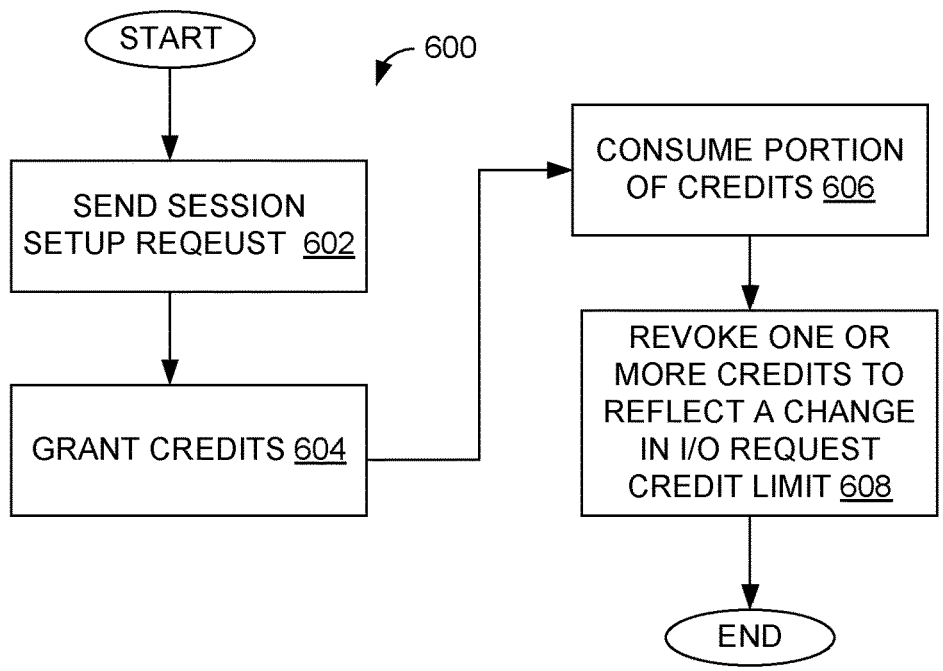
FIG. 6 is a flow diagram of an example process for decreasing a first number of I/O request granted to a client to a second number of I/O requests to re-balance the I/O request load.

In an alternative embodiment, a buffer credit coordinator may control the load-balancing by granting the client a first number of I/O requests to perform on the clustered storage system, and changing (e.g., decreasing) the first number of I/O requests to a second number of I/O requests. For example, FIG. 6 is a flow diagram of an example process 600 for decreasing a first number of I/O request granted to a client to a second number of I/O requests to re-balance the I/O request load. The process 600 may start when the client sends a session setup request specifying a multi-channel communication session according to operation 602 and requests credits from the clustered storage system. A buffer credit coordinator may then grant a first number of I/O requests to the client according to operation 604, 1000 credits for example. A client may then consume a portion of the credits according to operation 606, such as 500 credits. In this embodiment, a buffer credit coordinator may perform operation 608 to revoke one or more credits of the client to re-balance a cluster storage system workload (e.g., the buffer credit coordinator may revoke 490 credits from the client such that the client only has 10 credits remaining). There may be several reasons for the credit revocation. For example, the health of a node may have exponentially deteriorated during the client session, such as an outage of a network interface control, which may cause the overall clustered storage system or node I/O request credit limit to be reduced. In another example, the buffer credit coordinator may determine that an I/O request workload has quickly increased, causing the overall or node I/O request credit limit to be reduced. Accordingly, the buffer credit coordinator may revoke one or more credits from a client to reflect the reduced I/O request limit. In an alternative embodiment, the buffer credit coordinator may increase the first number of I/O requests granted to a client. This may also be due to several factors such as the replacement of a faulty component, which may cause an increase in the overall clustered storage system I/O request credit limit, or a relatively low I/O request load on the clustered storage system.

Figure 7:
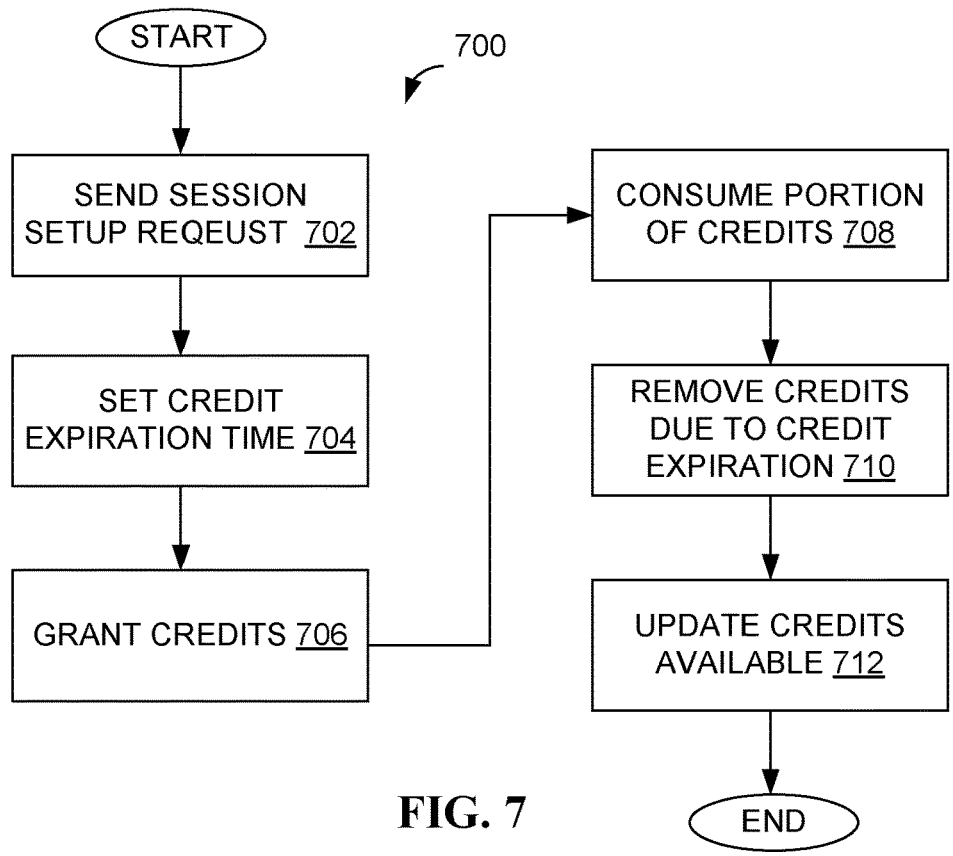
FIG. 7 is a flow diagram of an example process for removing client credits due to a credit limit expiration.

In some embodiments, a first quantity of I/O requests may be available to the client for a first amount of time, and after the first amount of time no I/O requests are available for the client. For example, FIG. 7 is a flow diagram of an example process 700 for removing client credits due to a credit limit expiration. The process 700 may start when the client performs operation 702 to send a session setup request. In embodiments, during session setup, the buffer credit coordinator or client may perform operation 704 to set a credit limit expiration time. For example, a buffer credit coordinator may determine that 60 seconds after a first quantity of I/O requests have been granted, all of the client credits will be revoked. The amount of time before expiration may be any amount of time depending on system hardware, I/O request load, or any other reason. According to some embodiments, clients with higher priority (e.g., clients that have historically performed the most I/O requests on the clustered storage system) may be assigned a longer credit expiration time. For example, a first client may have an IP address that the clustered storage system recognizes as repeatedly performing multiple I/O requests in different sessions. Accordingly, the buffer credit coordinator may allow the first client to use its credits for a predetermined time of 1 hour after a first quantity of credits have been issued. A second client may not have historically performed an I/O request on the clustered storage system other than a current session. A buffer credit coordinator may accordingly grant the client 20 minutes for the client to use its credits. In some embodiments, after the credit expiration time, the client may choose to request new credits in a different session.

In operation 706 a buffer credit coordinator may grant the client a particular quantity of credits. In some embodiments, the credit amount may depend on the amount of time left until credit revocation. In other embodiments, the credit amount is independent of the credit expiration timing. In operation 708, a client may consume only a portion of its credits after it has been granted a certain amount of credits for a certain amount of time, such as half of its credits.

After the client has consumed only a portion of its credits in operation 708, a buffer credit coordinator may perform operation 710 to remove a particular amount of credits due to a granted credit expiration. For example, a client may have been granted 300 credits that expire 30 minutes after the credits have been granted. At the time of credit expiration, the client may have only used 100 credits. In some embodiments, the buffer credit coordinator may remove all but one credit after the expiration time such that the client's updated credit limit is 1, according to operation 712. In another example, all of the client's credits may be removed such that the updated credit limit is zero. In other embodiments, the buffer credit coordinator may revoke only a certain percentage of credits after the given credit expiration time. For example, after the credit expiration time has expired, the client that has only used 100 credits of the available 300 credits, may only have 50 percent of the remaining credits revoked. Accordingly, the buffer credit coordinator may update the credit limit to 100 according to operation 712 as a result of revoking 100 of the remaining 200 credits.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
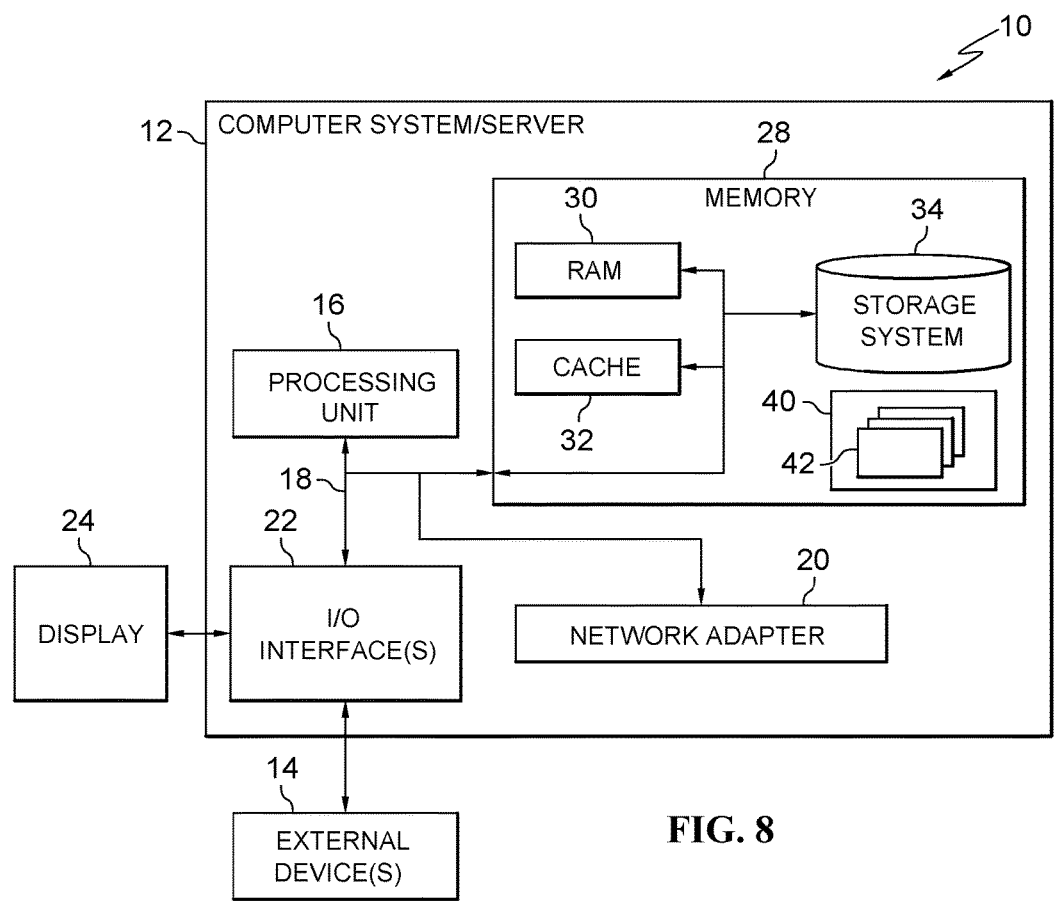
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
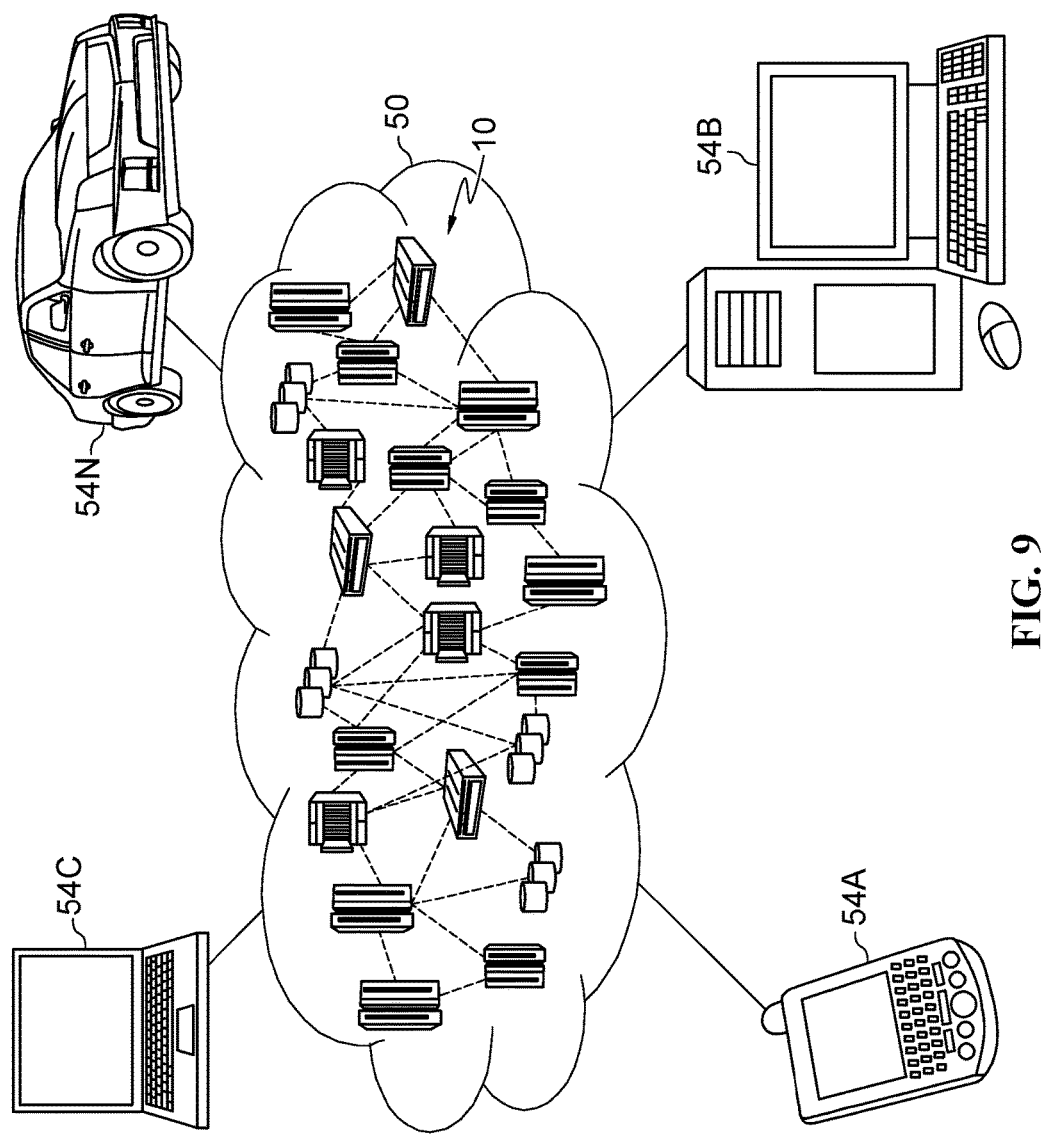
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
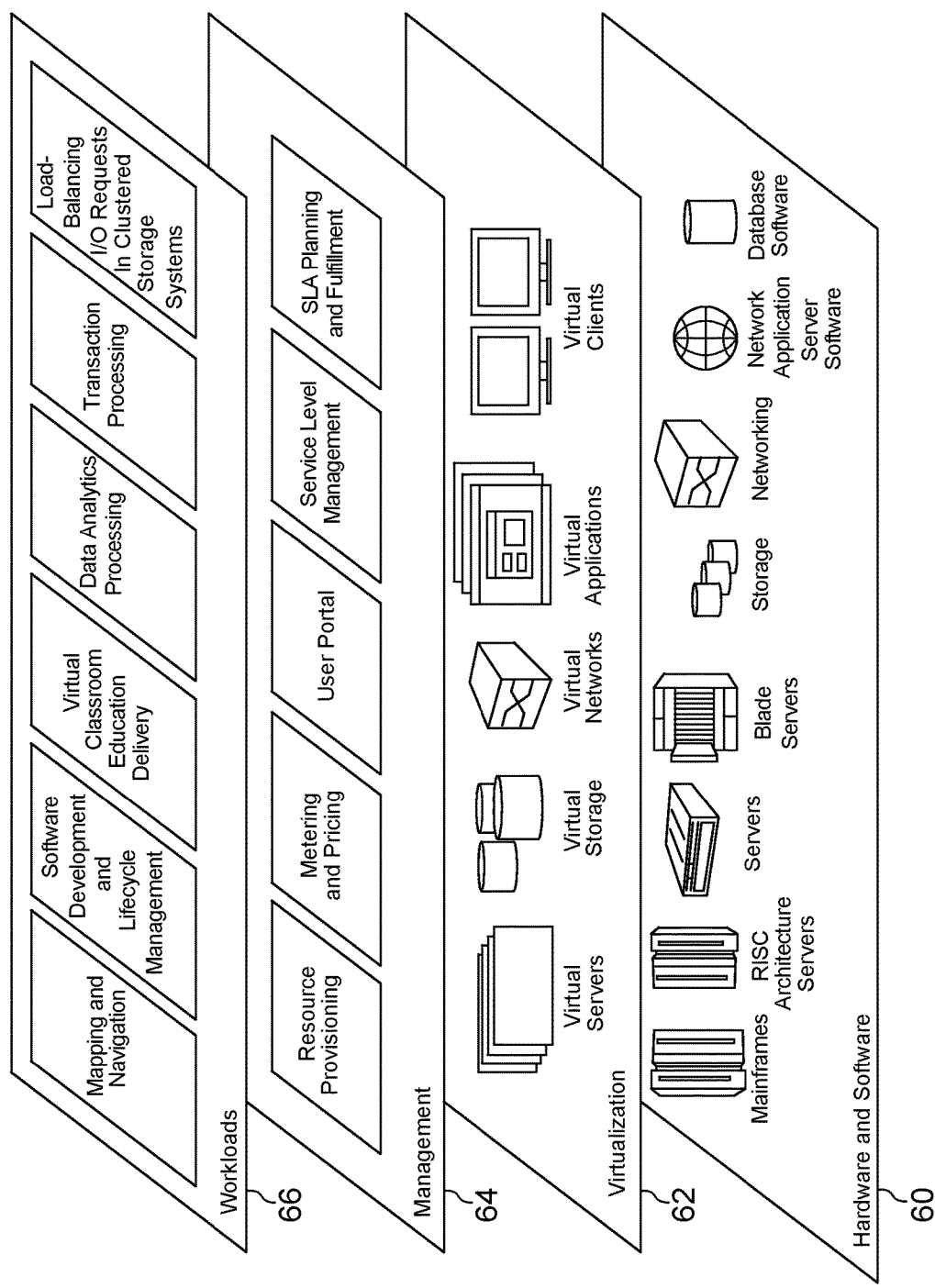
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and load-balancing I/O requests in clustered storage systems.

The present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for load-balancing client input/output (I/O) requests in a clustered storage system comprising:

receiving a request by a first node of a clustered storage system from a client to initiate a session between the client and the first node, the clustered storage system having a plurality of nodes and the request specifying a multi-channel communication session;

in response to receiving the request, transmitting an internet protocol (IP) address of the first node and an IP address of at least a second node to the client by the first node;

establishing the multi-channel communication session between the client and the first and second nodes in which the client communicates with the first node using a first communication channel and communicates with the second node using a second communication channel;

transmitting to the second node from the first node session data determined at the first node and transmitting to the first node from the second node session data determined at the second node;

determining a first I/O request limit for the clustered storage system;

determining a second I/O request limit for the first node and determining a third I/O request limit for the second node; and granting the client a first quantity of I/O requests for the client to transmit to the first node and granting the client a second quantity of I/O requests for the client to transmit to the second node, wherein the first quantity of I/O requests does not surpass the second I/O request limit and the second quantity of I/O requests does not surpass the third I/O request limit.

2. The method of claim 1, wherein the first and second quantities of I/O requests are granted in response to determining that a sum of the first and second quantities of I/O requests does not exceed the first I/O request limit.

3. The method of claim 1, further comprising adjusting the second I/O request limit and the third I/O request limit based on respective I/O request loads of each of the first and second nodes, and based on a health state of each of the first and second nodes.

4. The method of claim 1, wherein the first and the second quantity of I/O requests are available for the client for a first amount of time, and after the first amount of time no I/O requests are available for the client.

5. The method of claim 1, wherein the determining of the second and the third I/O request limits include determining a hardware capability value for a plurality of hardware components of each of the first and second nodes, wherein a lowest hardware capability value for the plurality of hardware components of the first node is the second I/O request limit and a lowest hardware capability value for the plurality of hardware components of the second node is the third I/O request limit.

6. The method of claim 1, wherein the determining of the first I/O request limit for the clustered storage system includes determining the clustered storage system's storage bandwidth and dividing the bandwidth by an average I/O request size for each I/O request performed by a plurality of clients to the plurality of nodes of the clustered storage system in a particular time interval.

7. The method of claim 1, wherein the determining of the first I/O request limit for the clustered storage system includes determining a quantity of I/O requests per second that the clustered storage system executes in a particular time interval.

8. A system for load-balancing client I/O requests in a clustered storage system, comprising:

a first node of a clustered storage system having plurality of nodes, the first node configured to receive a request from a client to initiate a session between the client and the first node, the request specifying a multi-channel communication session;

at least a second node, wherein the first node is further configured to transmit an interne protocol (IP) address of the first node and an IP address of the second node to the client in response to receiving the request;

wherein the first and second nodes are further configured to establish the multi-channel communication session between the client and the first and second nodes in which the client communicates with the first node using a first communication channel and communicates with the second node using a second communication channel; and wherein the first node is further configured to transmit to the second node session data determined at the first node and the second node is further configured to transmit to the first node session data determined at the second node; and a buffer credit coordinator configured to determine a first I/O request limit for the clustered storage system;

wherein the buffer credit coordinator is further configured to determine a second I/O request limit for the first node and determine a third I/O request limit for the second node; and wherein the buffer credit coordinator is further configured to grant the client a first quantity of I/O requests for the client to transmit to the first node and to grant the client a second quantity of I/O requests for the client to transmit to the second node, wherein the first quantity of I/O requests does not surpass the second I/O request limit and the second quantity of I/O requests does not surpass the third I/O request limit.

9. The system of claim 8, wherein the buffer credit coordinator is configured to grant the first and second quantities of I/O requests in response to determining that a sum of the first and second quantities of I/O requests does not exceed the first I/O request limit.

10. The system of claim 8, wherein the buffer credit coordinator is further configured to adjust the second I/O request limit and the third I/O request limit based on respective I/O request loads of each of the first and second nodes, and based on a health state of each of the first and second nodes.

11. The system of claim 8, wherein the buffer credit coordinator determines the second and the third I/O request limits by determining a hardware capability value for a plurality of hardware components of each of the first and second nodes, wherein a lowest hardware capability value for the plurality of hardware components of the first node is the second I/O request limit and a lowest hardware capability value for the plurality of hardware components of the second node is the third I/O request limit.

12. The system of claim 8, wherein the buffer credit coordinator determines the first I/O request limit for the clustered storage system by determining a quantity of I/O requests per second that the clustered storage system executes in a particular time interval.

13. A computer program product for load-balancing client I/O requests in a clustered storage system, the computer program product comprising a computer readable storage medium having program instructions embodied therewith, the program instructions executable by a clustered storage system to cause the clustered storage system to:

receive a request by a first node of the clustered storage system from a client to initiate a session between the client and the first node, the clustered storage system having a plurality of nodes and the request specifying a multi-channel communication session;

transmit, in response to the receiving of the request, an internet protocol (IP) address of the first node and an IP address of at least a second node to the client by the first node;

establish the multi-channel communication session between the client and the first and second nodes in which the client communicates with the first node using a first communication channel and communicates with the second node using a second communication channel;

transmit to the second node from the first node session data determined at the first node and transmit to the first node from the second node session data determined at the second node;

determine a first I/O request limit for the clustered storage system;

determine a second I/O request limit for the first node and determine a third I/O request limit for the second node; and grant the client a first quantity of I/O requests for the client to transmit to the first node and grant the client a second quantity of I/O requests for the client to transmit to the second node, wherein the first quantity of I/O requests does not surpass the second I/O request limit and the second quantity of I/O requests does not surpass the third I/O request limit.

14. The computer program product of claim 13, wherein the first and second quantities of I/O requests are granted in response to determining that a sum of the first and second quantities of I/O requests does not exceed the first I/O request limit.

15. The computer program product of claim 13, wherein the program instructions executable by the clustered storage system further cause the clustered storage system to make the first and the second quantity of I/O requests available for the client for a first amount of time, and after the first amount of time no I/O requests are available for the client.

16. The computer program product of claim 13, wherein the program instructions executable by the clustered storage system to cause the clustered storage system to determine the second and the third I/O request limits includes determining a hardware capability value for a plurality of hardware components of each of the first and second nodes, wherein a lowest hardware capability value for the plurality of hardware components of the first node is the second I/O request limit and a lowest hardware capability value for the plurality of hardware components of the second node is the third I/O request limit.

17. The computer program product of claim 13, wherein the program instructions executable by the clustered storage system to cause the clustered storage system to determine the first I/O request limit for the clustered storage system includes determining the clustered storage system's storage bandwidth and dividing the bandwidth by an average I/O request size for each I/O request performed by a plurality of clients to the plurality of nodes of the clustered storage system in a particular time interval.

* * * * *